United States Patent [19]

Drawert et al.

[11] Patent Number: 4,791,169

[45] Date of Patent: Dec. 13, 1988

[54] CARBOXYLATED POLYAMIDE FROM ISOPHTHALIC ACID AND POLYALKYLENE POLYAMINE

[75] Inventors: Manfred Drawert, Froendenberg; Horst Krase, Hamm, both of Fed. Rep. of Germany

[73] Assignee: Schering AG, Berlin and Bergkamen, Fed. Rep. of Germany

[21] Appl. No.: 932,698

[22] Filed: Nov. 19, 1986

[30] Foreign Application Priority Data

Nov. 26, 1985 [DE] Fed. Rep. of Germany ....... 3541693

[51] Int. Cl.$^4$ .................... C08G 69/34; C08L 77/08
[52] U.S. Cl. ................... 524/608; 528/338; 528/339; 528/339.3; 528/340
[58] Field of Search .................... 528/338, 339.3, 339, 528/340; 524/608

[56] References Cited

U.S. PATENT DOCUMENTS

| | | | |
|---|---|---|---|
| 2,482,761 | 9/1949 | Goebel | 260/407 |
| 3,256,304 | 6/1966 | Fischer et al. | 260/407 |
| 3,383,391 | 5/1968 | Carlick et al. | 260/326 |
| 4,191,669 | 3/1980 | Hinze et al. | 260/18 N |
| 4,341,670 | 7/1982 | Hinze et al. | 528/338 |
| 4,399,258 | 8/1983 | Hinze et al. | 525/184 |

FOREIGN PATENT DOCUMENTS 3246 8/1979 European Pat. Off. .

Primary Examiner—Harold D. Anderson
Attorney, Agent, or Firm—Curtis, Morris & Safford

[57] ABSTRACT

Polyamides containing carboxyl groups which, after neutralization with a base, are dilutable with water and which are the products of condensing (1) an amine mixture comprising trifunctional and difunctional amines with (2) an excess of an acid mixture consisting of isophthalic acid and a dimerzied fatty acid and/or a $C_6$–$C_{12}$ aliphatic dicarboxylic acid.

23 Claims, No Drawings

CARBOXYLATED POLYAMIDE FROM ISOPHTHALIC ACID AND POLYALKYLENE POLYAMINE

The present invention relates to polyamides containing carboxyl groups, to methods for their preparation, and to aqueous bronze dispersions containing the same.

Bronze paints find use today wherever it is desired that the coating films exhibit a metallic surface effect, and particularly a metallic luster in the tone of a precious metal, and where the leaf metals cannot be used because of cost or for technical reasons.

Bronze paints or bronze varnishes are surface coating compositions consisting of a vehicle, a solvent, and a bronze powder or bronze paste. Bronze powders include all pigments milled to scalelike metal particles or flakes (non-ferrous metals and alloys) which produce a metallic effect, regardless of their chemical composition or tone.

In addition to genuine gold bronze (gold dust), other bronze powders are used in the manufacture of goods which are produced in volume, such as "gold" bronzes manufactured from various copper-zinc alloys which determine their tone; temper bronzes aftertoned by means of oxidation (fire); "patent bronzes" toned with dyes; aluminum powders which serve as a substitute for sensitive silver or silver/nickel bronzes; and copper bronzes made from pure copper.

Bronze powders (metallic-effect pigments) may have a diameter ranging from a few millimeters (sequins) to a few microns. The particle size can be a factor affecting the gloss of the finished surface coating.

By suitable combination of vehicle, solvent, and additives (such as silicone or dispersants, stabilizers, and solubilizers) and by the use of appropriately treated pigments (leafing or nonleafing types), the effect desired in the coating film, for example a chrome effect, a metal effect, or a hammered effect, may be achieved.

In the manufacture of the paints, the vehicles and solvents must receive special attention because pigment corrosion, oxidation, or thickening may result in optically or physically flawed surfaces In recent years, aqueous bronze dispersions have found wide use, in addition to metals, as decorative coating compositions especially for absorbent substrates such as posterboard, boxboard, paperboard, and paper. Here the printing sector represents an important field of use, in which coatings with high covering power in various tones are required for various processes such as intaglio printing, screen printing, flexography, and offset printing.

For so-called silver printing, the printing inks are generally pigmented with aluminum in amounts ranging from 20 to 50 percent by weight.

The use of aluminum pigment is not without problems and calls for great care in the selection of suitable vehicles and solvents. For example, it is known that under certain conditions the pigments can react violently with both alkalis and with mineral acids, as well as with chlorinated hydrocarbons (Friedel-Crafts reaction). With resin acids, naphthenic acids, and most organic acids, graying of the surface and loss of leafing, if any, may occur as a result of corrosive attack on the pigment surface.

Depending on their fineness, aluminum pigments react with water, especially in the presence of bases, with evolution of hydrogen In addition to the drawbacks cited this may, under certain conditions, result in an undesirable rise in pressure in containers.

In practice, aluminum pigments therefore cannot be used in the form of their standard types, particularly in aqueous dispersions. In the past, special types have therefore been developed by the manufacturers for dispersions by special manufacturing methods, specific additives, and appropriate formulation.

In many respects, however, the profile of properties of these pigment types falls short of meeting practical requirements. For example, their storage stability in the presence of water is still limited, which is why many manufacturers recommend that the coating composition be prepared only just before it is applied. In addition, allowance must be made for the peculiarities of the different types by using specific types of vehicles and by providing specific directions for their use.

The object of the present invention is to overcome these drawbacks of the prior art and to find polyamides suitable for use as vehicles in aqueous bronze coating compositions, and particularly in aqueous aluminum-bronze dispersions, even when standard aluminum types are used.

This object is accomplished by means of polyamides which contain carboxyl groups comprising isophthalic acid, dimerized fatty acids and/or $C_6$-$C_{12}$ aliphatic dicarboxylic acids, polyalkylene polyamines, ethylenediamine, and, optionally, cycloaliphatic diamines.

A feature of the invention thus is polyamides which contain carboxyl groups which, after neutralization with a base, are dilutable with water and which can be prepared by the condensation of amino compounds and an excess of carboxylic acids and which are characterized in that the reactants used are (A) an acid mixture consisting of
  (a) isophthalic acid and
  (b) at least one member selected from the group consisting of dimerized fatty acids and aliphatic dicarboxylic acids having 6 to 12 carbon atoms wherein the ratio of (A)(a) to (A)(b) is from 0.7:0.3 to 0.80:0.20, based on total acid equivalents, and
(B) an amine mixture consisting of
  (a) diethylenetriamine and/or dipropylenetriamine and
  (b) (1) ethylenediamine and, optionally,
      (2) cycloaliphatic diamines, wherein the ratio of (B)(a) to (B)(b) is from 0.4:0.6 to 0.7:0.3, based on total amine equivalents, and the amount of (B)(b)(2) is not more than 0.25 equivalent, based on unit total amine equivalents (i.e. not more than 25 equivalent percent), and wherein the ratio of (A) to (B) is 1:0.7 to 1:0.85, based on the number of acid and amino equivalents.

Further features of the invention are defined in the claims.

The dimerized fatty acids which are used according to the invention are commercial products obtainable by prior art methods from unsaturated natural and synthetic monobasic aliphatic fatty acids having from 16 to 22, and preferably 18, carbon atoms. (See U.S. Pat. Nos. 2,482,761 and 3,256,304, for example).

Typical dimerized fatty acids which are on the market have approximately the following compositions:

| | |
|---|---|
| Monomeric acids | 5 to 15 wt. % |
| Dimeric acids | 60 to 80 wt. % |

| Trimeric and higher-polymerized acids | 10 to 35 wt. % |
|---|---|

In accordance with the invention, acids wherein dimers account for about 75 weight percent are preferred. However, fatty acids whose dimeric acid content has been increased by generally known distillation processes or which have been hydrogenated by prior art methods can also be used.

Aliphatic dicarboxylic acids which can be used in accordance with the invention include, in particular, those having from 6 to 12 carbon atoms, for example adipic acid, azelaic acid, sebacic acid, and decanedicarboxylic acid. Preferred acids are derived from saturated aliphatic hydrocarbons. The acids can be used either alone or mixed with each other to achieve special effects. However, since they affect the solubility and the softening point of the polyamide, they should generally be used in an amount of not more than about 0.2 equivalent, based on unit total acid equivalents (i.e. not more than about 20 equivalent percent of the acid component).

With a total amount of acid of 1.0 equivalent, the amount of isophthalic acid used according to the invention should be between 0.7 and 0.8, and more particularly between 0.75 and 0.80, equivalent: the balance is fatty acid and/or $C_6$–$C_{12}$ discarboxylic acid. While some slight deviation from these ranges is permissible, it will result in products which offer no advantages for the end use contemplated by the invention.

Preferably, in the acid component, the amount of dimerized fatty acids should be between about 0.2 and 0.3, and more particularly between 0.2 and 0.22, equivalent, based on unit total amount of acid.

Diethylenetriamine and dipropylenetriamine, which can be used either alone or in any desired mixture with each other, are suitable for use as polyamine component according to (B)(a). Their part of the total amount of amine (viz. 1.0 equivalent) should be between 0.4 and 0.7, and more particularly between 0.45 and 0.55, equivalent.

Either ethylenediamine [(B)(b)(1)]alone or mixtures of ethylenediamine and cycloaliphatic diamines (B)(b)(2)], and particularly 3,5,5-trimethyl-3-aminomethylcyclohexylamine and/or 3(4),8(9)-bis(aminomethyl)tricyclo[5.2.1.0$^{2,6}$]-decane and/or 3,3'-dimethyl-4,4'-diaminodicyclohexylamine, are suitable for use as codiamines according to (B)(b).

According to the invention, the amount of the codiamines is between 0.3 and 0.6, and more particularly between 0.45 and 0.55, equivalent, based on the total amine equivalents. The amount of the cycloaliphatic diamines (B)(b)(2)]should not exceed 0.25 equivalent.

While minor deviations from the limits specified are permissible, they will result in products which offer no advantages for the use contemplated by the invention, namely the production of aqueous bronze dispersions.

The ratio of acids to amines is determined by the requirements that the resuling polyamide be water soluble or at least able to be extensively diluted with water, and that the film properties meet practical requirements.

The water solubility or dilutability is obtained by performing the condensation with an excess of acid, based on the total amino groups, and then neutralizing the free carboxyl groups of the polyamide with one of the bases commonly used in this field, preferably a highly volatile organic base such as ammonia, triethylamine, 2-dimethylamino-2-methylpropanol, 2-methyl-2-aminopropanol, morpholine, diethylaminoethanol, dimethylaminoethanol, ethanolamine, diethanolamine, or triethanolamine.

However, with increasing excess of acid, that is, decreasing chain length of the polyamide, the film properties become poorer, and an upper limit is therefore imposed by the required quality characteristics of the film.

A ratio of carboxyl groups to amino groups ranging from about 1:0.7 to 1:0.85, and more particularly from 1:0.75 to 1:0.8, has proved adequate. The resulting polyamides then have carboxyl groups corresponding to an acid number from about 50 to 150, and more particularly from 75 to 120.

The condensation reaction is carried out by the methods commonly used in this field, the individual components being generally randomly distributed in the polymer molecule, although partial block formation cannot be ruled out. The reaction temperatures range from about 210° C. to 250° C., and the total reaction time from about 4 to 8 hours.

The acid numbers have been determined in conformity with DIN 53402 and the amine values of the polyamides, which may range from about 15 to 50, and more particularly from 20 to 35, in conformity with DIN 16945.

The metal pigments which are used according to the invention are known collectively as "bronzes". The is the terms generally used to designate all pigments which produce a metallic effect, regardless of tone and chemical composition tion (DIN 55943, 55944, and 55945). In accordance with the invention, bronze powders, that is metals and alloys reduced to flakes of particle sizes no greater than 45 microns, are preferred.

In addition to the genuine gold, silver, and copper bronzes, alloys having the corresponding colors or the bronzes toned with soluble dyes are used here. In particular, aluminum pigment (DIN 55923) has gained wide acceptance as a substitute for silver bronze.

The ratio between bronze and vehicle is not critical; it depends on the type of the bronze and also on the desired rheological, optical, and general coating properties of the dispersion or finished film. The pigmentation of the printing inks for the various methods of application generally ranges from 20 to 60 percent by weight of bronze powder and from 80 to 40 percent of vehicle. In some fields of use, the lower limit of the bronze component may be even less than 1 percent, and the upper limit about 95 weight percent.

The dispersion is prepared by methods generally employed in this field, optionally with the concurrent use of customary additives such as thickeners, stabilizers, wetting agents, short-chain alcohols, and glycol ethers. The mode of action and amounts of these additives are part of the prior art. The only condition here is that they be inert to standard aluminum bronzes.

Thus, one procedure followed in accordance with the invention is to prepare, at the boiling point, with stirring, a solution of 15 g of resin, 3 g of triethylamine, and 32 g of isopropanol/water (1:1) into which after cooling 9 g of water and 2.6 g of propylene glycol monomethyl ether are stirred and then 9.4 g of aluminum bronze are dispersed.

The aluminum bronzes used are the commercially produced "Standard Aluminum Powders Stapa IL Chromal IV and Chromal X" (Eckart-Werke, 851 Fuerth, West Germany) All other bronzes used are also commercially produced standard types.

As is apparent from following Table II, only the inventive dispersions in combination with the critical aluminum bronzes remained liquid and usable, while the products used for comparison started to foam after just a short time and shortly thereafter solidified.

The polyamides of Table I, used in accordance with the invention as vehicles, were prepared as in following Example 1.

EXAMPLE 1

172.5 g of dimeric acid (dimer content, 75%),
178.5 g of isophthalic acid,
35.4 g of diethylenetriamine (DTA),
24.3 g of ethylenediamine (EDA),
27.2 g of isophoronediamine (IPD), and
44 ml of water (about 10 wt. %, based on the reactants)

were charged into a one-liter three-neck flask equipped with thermometer, stirrer, and distilling column and flushed with nitrogen. The temperature was raised over 2 hours to 230° C. and then held there for 2 hours. To carry the reaction to completion, a condensation step then followed at 230° C. and 16 millibar.

TABLE I

| EXAMPLES: | Acid equivalent (A) | | Ratio of amine equivalents (B) | | | | Ratio A:B | Acid number | Ring-and-ball test DIN 1995 °C. |
| --- | --- | --- | --- | --- | --- | --- | --- | --- | --- |
| | Ratio of isophthalic acid (a) | dimeric fatty acid (b) (dimer content, wt. %) | Diethylene triamine (a) | Ethylene-diamine (b)(1) | Codiamine (b)(2) | | | | |
| Invention | | | | | | | | | |
| 1 | 0.78 | 0.22 (75) | 0.475 | 0.375 | IPD(1) | 0.150 | 1:0.78 | 111 | 161 |
| 2 | 0.75 | 0.25 (75) | 0.476 | 0.379 | DDM(2) | 0.143 | 1:0.75 | 86.2 | 160 |
| 3 | 0.78 | 0.22 (70) | 0.475 | 0.375 | TCD(3) | 0.150 | 1:0.78 | 91 | 159 |
| 4 | 0.78 | 0.22 (80) | 0.475 | 0.375 | DDM | 0.150 | 1:0.78 | 81 | 161 |
| 5 | 0.78 | 0.22 (75) | 0.400 | 0.375 | DDM | 0.225 | 1:0.78 | 85 | 160 |
| 6 | 0.78 | 0.22 (96) | 0.500* | 0.500 | — | | 1:0.8 | 120 | 100 |
| 7 | 0.78 | 0.22 (60) | 0.400* | 0.400 | IPD | 0.200 | 1:0.8 | 111 | 136 |
| 8 | 0.78 | 0.22 (75) | 0.400* | 0.600 | — | | 1:0.8 | 117 | 117 |
| 9 | 0.78 | 0.22 (75) | 0.700 | 0.300 | — | | 1:0.8 | 76 | 165 |
| Comparison | | | | | | | | | |
| 1 | 0.78 | 0.22 (96) | 0.475 | 0.200 | IPD | 0.325 | 1:0.78 | 96 | 170 |
| 2 | 0.60 | 0.40 (75) | 0.450 | 0.350 | IPD | 0.200 | 1:0.8 | 79 | 122 |
| 3 | 0.78 | 0.22 (75) | 0.500 | HDA(4) 0.400 | IPD | 0.100 | 1:0.8 | 51 | 160 |

*Dipropylenetriamine
(1)IPD = 3,5,5-Trimethyl-3-aminomethylcyclohexylamine
(2)DDM = 3,3'-Dimethyl-4,4'-diaminodicyclohexylmethane
(3)TDD = 3(4),8(9)-bis(Aminomethyl)tricyclo[5.2.1.0$^{2,6}$]decane
(4)HDA = 1,6-Diaminohexane

TABLE II

| | State after a pot life of 10 weeks at room temperature with | |
| --- | --- | --- |
| | Chromal IV | Chromal X |
| Example | | |
| 1 | Liquid | Liquid |
| 2 | Liquid | Liquid |
| 3 | Liquid | Liquid |
| 4 | Liquid | Liquid |
| 5 | Liquid | Liquid |
| 6 | Liquid | Liquid |
| 7 | Liquid | Liquid |
| 8 | Liquid | Liquid |
| 9 | Liquid | Liquid |
| 10 | Liquid | Liquid |
| 11 | Liquid | Liquid |
| 12 | Liquid | Liquid |
| 13 | Liquid | Liquid |
| 14 | Liquid | Liquid |
| Comparison | | |
| 1 | Solid | Solid |
| 2 | Solid | Solid |
| 3 | Solid | Solid |

What is claimed is:

1. A carboxylated polyamide condensation product formed between
   (A) an acid component comprising
      (2) isophthalic acid and
      (2) at least one dimerized fatty acid, wherein the ratio of acid equivalents of (A)(1) to (A)(2) is from 0.7:0.3 to 0.8:0.2, and
   (B) an amine component comprising
      (1) at least one member selected from the group consisting of diethyelentriamine and dipropylenetriamine, and
      (2) (a) ethylenediamine and
      (b) a cycloaliphatic diamine, wherein the ratio of amino equivalents (B)(I) to (B)(2) ranges from 0.4:0.6 to 0.7:0.3 and the amount of (B)(2)(b) is from zero to 25 equivalent percent of the total amine component (B) and the ratio if (A) to (B) is from 1:0.7 to 1:0.85, based on the number of acid and amine equivalents, respectively.

2. A polyamide as in claim 1 wherein the ratio of equivalents of (A)(1) to (A)(2) is from 0.75:0.25 to 0.78:0.22.

3. A polyamide as in claim 1 wherein the ratio of equivalents of (B)(1) to (B)(2) is from 0.45:0.55 to 0.55:0.45.

4. A polyamide as in claim 1 wherein said acid component (A) contains from 20 to 30 equivalent percent of dimerized fatty acids (A)(2).

5. A polyamide as in claim 1 wherein said cycloaliphatic diamine (B)(2)(9b) includes at least one of the diamines 3,3'-dimethyl-4,4'-diaminodicyclohexylmethane, 3,5,5-trimethyl-3-aiminomethylcyclohexylamine, or 3(4), 8(9)bis(aminomethyl)tricyclo[5.2.1.0$^{2,6}$]-decane.

6. A polyamide as in claim 1 wherein the ratio of equivalents of (A) to (B) is from 1:0.75 to 1:0.8.

7. An aqueous bronze dispersion comprising a bronze powder dispersed in a liquid vehicle which is a solution of a polyamide as a in claim 1 in a mixture of alcohol, water and a short-chain amine.

8. A method for making a carboxylated polyamide as in claim 1 which comprises condensing, under an inert gas at a temperature from 210° C. to 250° C.,
(A) an acid component comprising
(1) isophthalic acid and
(2) at least one dimerized fatty acid, wherein the ratio of acid equivalents of (A)(1) to (A)(2) is form 0.7:0.3 to 0.8:0.2 and
(B) an amine component comprising
(a) at least one member selected from the group consisting of diethylenetriamine and dipropylenetriamine, and
(2)
(a) ethylenediamine and
(b) a cycloaliphatic diamine, wherein the ratio of amino equivalents (B)(1) to (B)(2) ranges from 0.4:0.6 to 0.7:0.3 and the amount of (B)(2)(b) is from zero to 25 equivalent percent of th e total amine component (B) and the ratio of (A) to (B) is from 1:0.7 to 1:0.85, based on the number of acid and amino equivalents, respectively.

9. A carboxylated polyamide condensation product formed between
(A) an acid component comprising
(1) isophthalic acid and
(2) at least one aliphatic dicarboxylic acid having from 6 to 12 carbon atoms, wherein the ratio of acid equivalents of (A)(1) to (A)(2) is from 0.7:0.3 to 0.8:0.2 and said aliphatic dicarboxylic acids are not more than about 20 equivalent percent of the total acid component (A), and
(B) an amine component comprising
(1) at least one member selected from the group consisting of diethylenetriamine and dipropylenetriamine, and
(2)
(a) ethylenediamine and
(b) a cycloaliphatic diamine, wherein the ratio of amine equivalents (B)(1) to (B)(2) ranges from 0.4:0.6 to 0.7:0.3 and the amount of (B)(2)(b) is from zero to 25 equivalent percent of the total amine component (B), and the ratio of (A) to (B) is from 1:0.7 to 1:0.85, based on the number of acid and amine equivalents, respectively.

10. A polyamide as in claim 9 wherein the ratio of equivalents of (A)(1) to (A)(2) is from 0.75:0.25 to 0.78 to 0.22.

11. A polyamide as in claim 9 wherein the ratio of equivalents of (B)(1) to (B)(2) is from 0.45:0.55 to 0.55:0.45.

12. A polyamide as in claim 9 wherein said cycloaliphatic diamine (B)(2)(b) includes at least one of the diamines 3,3'-dimethyl-4,4,-diaminodicyclohexylmethane, 3,5,5-trimethyl-3-aminomethylcyclohexylamine, or 3(4),8(9)-bis(aminomethyl)tricyclo[$5.2.1.0^{2,6}$]-decane.

13. A polyamide as in claim 9 wherein the ratio of equivalents of (A) to (B) is from 1:0.75 to 1:0.8.

14. A method for making a carboxylated polyamide as in claim 9 which comprises condensing, under an inert at a temperature from 210° C. to 250° C.,
(A) an acid component comprising
(1) isophthalic acid and
(2) at least one aliphatic diacarboxylic acid having from 6 to 12 carbon atoms, wherein the ratio of acid equivalents of (A)(1) to (A)(2) is from 0.7:0.3 to 0.8:0.2 and said aliphatic dicarboxylic acids are not more than about 20 equivalent percent of the total acid component (A), and
(B) an amine component comprising
(1) at least one member selected from the group consisting of diethylenetriamine and dipropylenetriamine, and
(2)
(a) ethylenediamine and
(b) a cycloaliphatic diamine, wherein the ratio of amino equivalents (B)(1) to (B)(2) ranges from 0.4:0.6 to 0.7:0.3 and the amount or (B)(2)(b) is from zero to 25 equivalent percent of the total amine component (B) and the ratio of (A) to (B) is from 1:0.7 to 1:0.85, based on the number of acid and amino equialents, respectively.

15. An aqueous bronze dispersion comprising a bronze powder dispersed in a liquid vehicle which is a solution of a polyamide as in claim 9 in a mixture of aloohol, water, and a short-chain amine.

16. A carboxylated polyamide condensation product formed between
(A) an acid component conprising
(1) isophthalic acid and
(2) a mixture of at least one dimerized fatty acid and at least one aliphatic dicarboxylic acid having from 6 to 12 carbon atoms, wherein the ratio of acid equivalents of (A)(1) to (A)(2) is from 0.7:0.3 to 0.8:0.2 and said aliphatic dicarboxylic acids are not more than about 20 equivalent percent of the total acid component (A), and
(B) an amine component comprising
(1) at least one member selected from the group consisting of diethylenetriamine and dipropylenetriamine, and
(2)
(a) ethylenediamine and
(b) a cycloaliphatic diamine, wherein the ratio of amine equivalents (B)(1) to (B)(2) ranges from 0.4:0.6 to 0.7:0.3 and the amount of (B)(2)(b) is from zero to 25 equivalent percent of the total amine components (B) and the ratio of (a) to (b) is from 1:0.7 to 1:0.85, based on the number of acid and amine equivalents, respectively.

17. A polyamide as in claim 16 wherein the ratio of equivalents of (A)(1) to (A)(2) is from 0.75:0.25 to 0.78 to 0.22.

18. A polyamide as in claim 16 wherein the ratio of equivalents of (B)(1) to (B)(2) is from 0.45:0.55 to 0.55:0.45.

19. A polyamide as in claim 16 wherein said acid component (A) contains from 20 to 30 equivalent percent of dimerized fatty acids (A)(2).

20. A polyamide as in claim 16 wherein said cycloaliphatic diamine (B)(2)(b) includes at least one of the diamines 3,3'-dimethyl-4,4'-diaminodicyclohexylmethane, 3,5,5-trimethyl-3-aminomethylcyclohexylamine, or 3(4), 8(9)-bis(aminomethyl)tricyclo[$5.2.1.0^{2,6}$]-decane.

21. A polyamide as in claim 16 wherein the ratio of equivalents of (A) to (B) is from 1:0.75 to 1:0.8.

22. A method for making a carboxylated polyamide as om claim 16 which comprises condensing, under an inert gas at a temperature from 210° C. to 250° C.,
(A) an acid component comprising
(1) isophthalic acid and (2) a mixture of at least one dimerized fatty acid and at least one aliphatic dicarboxylic acid having from 6 to 12 carbon atoms,
wherein the ratio of acid equivalents of (A)(1) to (A)(2) is from 0.7:0.3 to 0.8:0.2 and said aliphatic dicarboxylic acids are not more than about 20 equivalent percent of the total acid component (A), and
(B) an amine component comprising
(1) at least one member selected from the group consisting of diethylenetriamine and dipropylenetriamine, and
(2)
(a) ethylenediamine and
(b) a cycloaliphatic diamine,
wherein the ratio of amine equivalents(B)(1) to (B)(2) ranges from 0.4:0.6 to 0.7:0.3 and the amount of (B)(2)(b) is from zero to 25 equivalent percent of the total amine component (B), and the ratio of (A) to (B) is from 1:0.7 to 1:0.85, based on the number of acid and amino equivalents, respectively.

23. An aqueous bronze dispersion comprising a bronze powder dispersed in a liquid vehicle which is a solution of a polyamide as in claim 16 in a mixture of alcohol, water, and a short-chain amine.

* * * * *